Oct. 14, 1952     J. F. SCHWEBEL, SR     2,613,561
EYEGLASS RIM-STRETCHING APPARATUS
Filed Jan. 4, 1951
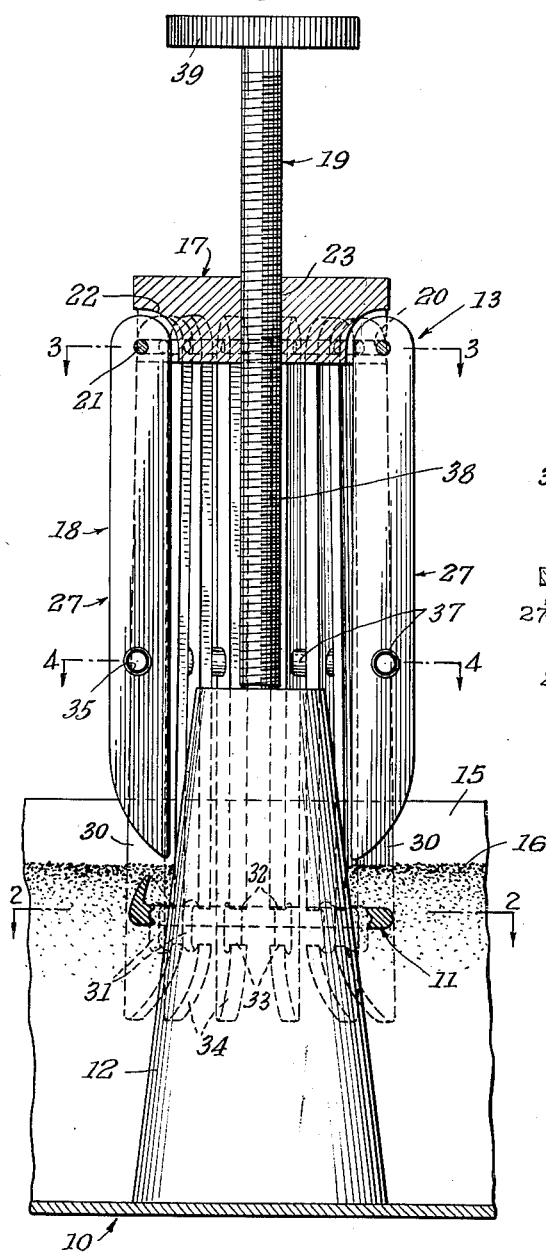
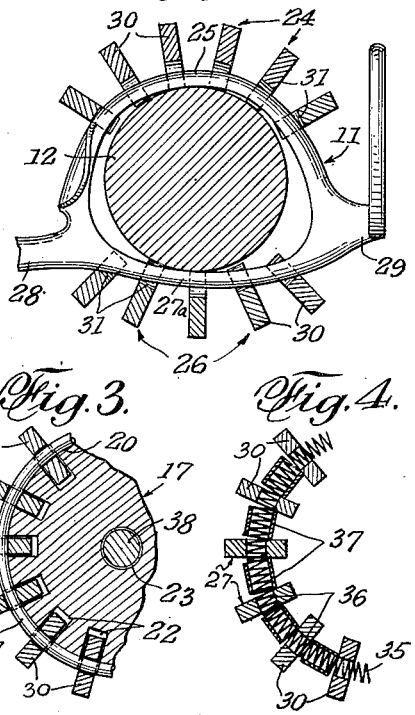
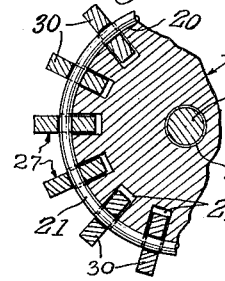
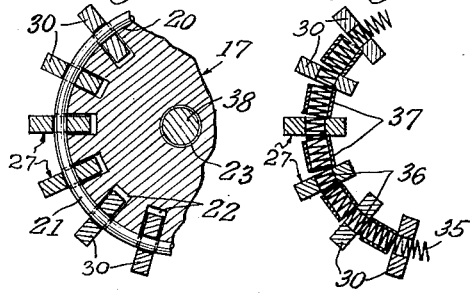
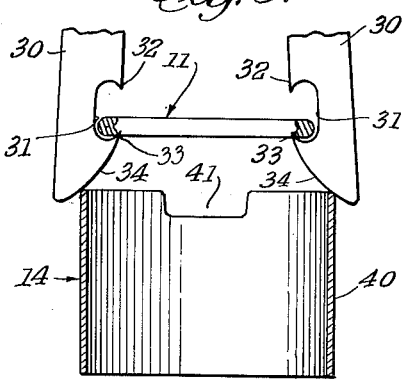
Inventor
JOHN F. SCHWEBEL, SR.
By C. G. Stratton
Attorney Patented Oct. 14, 1952

2,613,561

UNITED STATES PATENT OFFICE 2,613,561

EYEGLASS RIM-STRETCHING APPARATUS

John F. Schwebel, Sr., Van Nuys, Calif.

Application January 4, 1951, Serial No. 204,332

2 Claims. (Cl. 81—3.5)

This invention relates to means for stretching the rims of non-metallic ophthalmic frames.

The rims of present day ophthalmic frames are seldom round and stretching of said rims, when necessary, cannot be efficiently carried out unless several spaced points of such asymmetric rims are engaged by the stretching means. Accordingly, it is an object of this invention to provide expansible rim-engaging means that automatically adjusts itself to the asymmetric form of a rim to more efficiently stretch said rim as said means is expanded.

Another object of the invention is to provide novel apparatus that embodies both rim-stretching means and means for removing the rims from the stretching means.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a longitudinal sectional view of rim-stretching means according to the present invention.

Fig. 2 is a cross-sectional view thereof as taken on line 2—2 of Fig. 1.

Figs. 3 and 4 are fragmentary plan sectional views as taken on the planes of lines 3—3 and 4—4, respectively.

Fig. 5 is a vertical sectional view showing rim-removing means.

As illustrated in the drawing, the invention contemplates the provision of means 10 for applying heat to the rim 11 of an ophthalmic frame, a frusto-conical member 12 supported in means 10, means 13 for engaging rim 11 to apply the same to member 12 and thereby stretch said rim, and means 14 for effecting removal of the stretched rim from the means 13.

The means 10 is generally conventional and, as shown, comprises a tray or box 5 containing a quantity of common table salt 16. By applying heat to tray 15, the salt is heated and serves as the medium for effecting safe non-vaporizing transfer of heat to a non-metallic ophthalmic frame immersed therein.

The frusto-conical member 12 is preferably made of aluminum and, while shown is of circular cross-section, may be oval or otherwise formed. The member 12 is proportioned so that the same will fit into the full range of rim sizes, smaller rims fitting nearer the smaller top of said member and larger rims nearer the larger bottom thereof. Said member 12 is set into tray 15 and is surrounded by salt 16. It will be understood that by pressing down on a rim placed over member 12, said rim, due to the heat exchange with the salt, will be rendered plastic and will be stretched according to the diametral size of that portion of member 12 which is engaged with the rim. As the rim stretches, the same is pressed down into successively larger portions of member 12.

The means 13 is provided for holding the rim while the same is being stretched and comprises the means for exerting downward pressure on the rim. The means 13 comprises, generally, a mounting disc 17, a set of fingers 18 carried by said disc and engageable with a rim 11, and a screw member 19 extending axially through the disc 17 and serving to limit the rim-stretching movement of the device and also as a jacking means to effect removal of the device and the rim from cone member 12.

The mounting disc 17 is generally circular and is provided in its peripheral face with a groove 20 into which is fitted a circular wire 21. A set of radial recesses 22 is formed in the peripheral portion of the disc, the same being loosely receptive of the upper ends of fingers 18. The wire 21, where the same spans across said recesses, constitutes hinges for said fingers. A through central and tapped hole 23 is provided in the disc for screw member 19.

The fingers 18 are uniformly arranged and, in this case, are arranged in four groups: a group 24 of six fingers for engaging the more rounded lower portions 25 of rim 11; an opposed group 26 of five fingers for engaging the flatter less rounded upper portion 27a of said rim; and two similar groups 27 that separate groups 24 and 26. Figs. 1, 3 and 4 show finger groups 27 and it will be seen from Figs. 3 and 4 and from the spaces between groups 24 and 26 in Fig. 2, that there are two fingers in each group 27.

All of the fingers comprise elongated flat members, of which the fingers of groups 24 and 26 are longer than the fingers of groups 27. The latter fingers serve primarily as spacers filling out the circular arrangement of fingers, said shorter fingers terminating short of where the nose piece 28 and temple extensions 29 are located on a rim.

Each finger 30 of groups 24 and 26, near its free end, is provided with a notch 31 formed in the inner edge thereof, the same terminating in upper and lower hooks, respectively, 32 and 33. Below the notch, each finger is formed to have a sloping cam face 34.

Intermediate their ends, the fingers are connected by a circular coiled spring 35 that passes through holes 36 provided in the fingers. Spacer tubes 37 are strung on said spring to space the fingers so that normally, they are substantially parallel under contraction by the spring.

The screw member 19 comprises a threaded stem 38 engaged in hole 23 and having at its upper end a manipulating knob 39.

The means 14 comprises a metal tube 40 in one end of which is provided opposed recesses 41. Fig. 5 shows only one of said recesses, but it will be understood that the other is substantially opposite or rather in such alignment that the nose piece 28 and temple extension 29, when the rim is placed on the tube 40, reside above said recesses.

In use, a rim 11 to be stretched, is strung on cone 12. With the screw member retracted upwardly, the rim-engaging means 13 is applied over the end of the cone. Since the fingers 30 of said means are contracted inwardly by spring 35, the cam faces 34 will ride the conical face of the cone until said cam faces ride over the rim, being spread or expanded to allow continued downward movement of means 13. As hooks 33 slip past the rim, spring 35 will contract the fingers inwardly and the rim will be engaged in notches 31, as shown in Fig. 1. Now, while heat is applied to means 10, downward pressure is slowly applied to either knob 39 or disc 17, so that hooks 32, which engage over the rim, may force the same tightly against successively larger portions of cone 12. As the heat transferred to the rim softens the same, the rim will enlarge accordingly. Since hooks 32 of the several fingers engage spaced portions of the rim, the enlargement of the latter is effected substantially uniformly, thereby minimizing the danger of fracture of the rim and also undue distortion thereof.

During this rim-stretching process, the lower end of stem 38 can be set to rest against the top of cone 12 and the screw member gradually backed off as rim expansion takes place. In this manner the expansion pressure on means 13 is limited and controlled by said screw member.

When the rim has been suitably stretched, a quick upward pull on means 13 will bring hooks 33 against the rim to dislodge the same from the cone. However, it is preferred to dislodge the rim by utilizing the screw stem 38 as a jack by threading the same against the end of the cone to effect withdrawal of the rim by hooks 33.

It will be realized that the rim and the lower ends of fingers 30 have been subjected to heat and that it is inconvenient to handle the same to effect removal of the rim from the notches 31. By placing the lower ends of the fingers over the means 14 and pressing downwardly, the cam faces 34 are spread, allowing the rim to fall onto the top edge of tube 40. This removal of the rim can be done quickly before the same recontract, enabling insertion of a lens into the rim while the same is in an expanded state. When the rim cools, it will contract over the lens and hold the same firmly.

While the invention that has been illustrated and described is now regarded as the preferred embodiment, the construction is, of course, subjected to modifications without departing from the spirit and scope of the invention. It is, therefore, not desired to restrict the invention to the particular form of construction illustrated and described, but to cover all modifications that may fall within the scope of the appended claims.

Having thus described the invention, what is claimed and desired to be secured by Letters Patent is:

1. An ophthalmic rim-stretching device adapted for use in cooperation with a frusto-conical member, said device comprising a disc having a threaded aperture therein, a set of elongated fingers arranged around the periphery of the disc and hinged thereto, spring means intermediate the ends of the fingers connecting the same to contract toward each other, a screw stem in said aperture and extending generally centrally among the fingers, an end of said stem being adapted to engage the smaller end of said frusto-conical member and to be turned relative to said disc and fingers to move said disc and fingers longitudinally of the stem and of the frusto-conical member, a cam face provided on the inwardly-facing edge of a majority of said fingers to cam over an ophthalmic rim strung on the frusto-conical member, and a downwardly directed hook provided on said inwardly-facing edge of each of said fingers and above each said surface to hook onto said rim to force said rim in a direction toward the larger diameter of said frusto-conical member and to stretch said rim accordingly as the disc and fingers are moved in said direction.

2. A rim-stretching device according to claim 1: the fingers provided with the cams and hooks being divided into two substantially opposed groups to engage upper and lower portions of the rim, the remaining fingers being shorter than the fingers having the hooks to be spaced from the rim during stretching thereof, and all of the fingers being arranged in substantially uniform spacing.

JOHN F. SCHWEBEL, Sr.

REFERENCES CITED

The following references are of record in the file of this patent:

UNITED STATES PATENTS

| Number | Name | Date |
| --- | --- | --- |
| 491,853 | Noe | Feb. 14, 1893 |
| 1,572,776 | De Nome | Feb. 9, 1926 |
| 1,632,266 | Baker | June 14, 1927 |
| 1,685,167 | Ljunglof | Sept. 25, 1928 |
| 1,764,116 | Noble | June 17, 1930 |